(12) United States Patent
Hiramoto et al.

(10) Patent No.: US 10,916,801 B2
(45) Date of Patent: Feb. 9, 2021

(54) MANUFACTURING METHOD OF ELECTRODE BODY AND ELECTRODE BODY

(71) Applicant: TOYOTA JIDOSHA KABUSHIKI KAISHA, Toyota (JP)

(72) Inventors: Natsumi Hiramoto, Toyota (JP); Akihiro Ochiai, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 15/665,638

(22) Filed: Aug. 1, 2017

(65) Prior Publication Data
US 2018/0048021 A1    Feb. 15, 2018

(30) Foreign Application Priority Data

Aug. 9, 2016  (JP) .................................. 2016-156857

(51) Int. Cl.
*H01M 10/0562*    (2010.01)
*H01M 4/04*    (2006.01)
(Continued)

(52) U.S. Cl.
CPC ....... *H01M 10/0562* (2013.01); *B32B 37/182* (2013.01); *H01M 4/0402* (2013.01); *H01M 4/139* (2013.01); *H01M 4/36* (2013.01); *H01M 4/667* (2013.01); *H01M 4/80* (2013.01); *H01M 10/0459* (2013.01); *H01M 10/0583* (2013.01); *B32B 2037/1063* (2013.01); *B32B 2311/00* (2013.01); *B32B 2457/10* (2013.01); *H01G 11/26* (2013.01); *H01G 11/84* (2013.01)

(58) Field of Classification Search
CPC ... B32B 37/182; H01M 4/0402; H01M 4/139; H01M 4/667; H01M 10/0459
See application file for complete search history.

(56) References Cited

U.S. PATENT DOCUMENTS

| 2014/0377631 | A1 | 12/2014 | Park et al. |
| 2015/0034249 | A1 | 2/2015 | Lee et al. |
| 2015/0069109 | A1* | 3/2015 | Mori ...................... B32B 37/18 228/18 |

FOREIGN PATENT DOCUMENTS

| CN | 105210228 A | 12/2015 |
| JP | 10154501 A | 6/1998 |

(Continued)

*Primary Examiner* — Jonathan G Jelsma
(74) *Attorney, Agent, or Firm* — Sughrue Mion, PLLC (57) ABSTRACT

A method of manufacturing an electrode body includes a charging step, a first laminating step, and a second laminating step to manufacture the electrode body by laminating positive and negative electrode plates by interposing a separator therebetween. In the charging step, one of the positive and negative electrode plates is a first electrode plate and an other one is a second electrode plate, and one of the first electrode plate and the separator is charged to a potential enough to generate an attraction force between the first electrode plate and the separator. The first laminating step includes bringing the first electrode plate and the separator, at least one of which is charged, into direct contact to attach each other to form a laminated body. In the second charging step, the second electrode plate is laminated on the laminated body to form the electrode body.

3 Claims, 7 Drawing Sheets

(51) Int. Cl.
  *B32B 37/18* (2006.01)
  *H01M 4/139* (2010.01)
  *H01M 4/36* (2006.01)
  *H01M 4/66* (2006.01)
  *H01M 4/80* (2006.01)
  *H01M 10/04* (2006.01)
  *H01M 10/0583* (2010.01)
  *B32B 37/10* (2006.01)
  *H01G 11/26* (2013.01)
  *H01G 11/84* (2013.01)

(56) References Cited

FOREIGN PATENT DOCUMENTS

| | | | |
|---|---|---|---|
| JP | 2001-345115 A | | 12/2001 |
| JP | 2001338630 A | | 12/2001 |
| JP | 2012022813 A | | 2/2012 |
| JP | 2014186830 A | * | 10/2014 |
| JP | 2015-529957 A | | 10/2015 |
| JP | 2015-537337 A | | 12/2015 |
| KR | 101040704 B1 | * | 6/2011 |

* cited by examiner

MANUFACTURING METHOD OF ELECTRODE BODY AND ELECTRODE BODY

CROSS-REFERENCE TO RELATED APPLICATIONS

This application is based upon and claims the benefit of priority from the prior Japanese Patent Application No. 2016-156857 filed on Aug. 9, 2016, the entire contents of which are incorporated herein by reference.

BACKGROUND

Technical Field

The present disclosure relates to a manufacturing method of an electrode body and an electrode body, more particularly to a method for manufacturing an electrode body by laminating a positive electrode plate and a negative electrode plate with a separator interposed therebetween.

Related Art

A secondary battery such as a lithium ion secondary battery includes an electrode body, which is housed in a casing. The electrode body is sometimes manufactured by stacking a positive electrode plate and a negative electrode plate flatwise with a separator interposed therebetween. This type of manufacturing method of an electrode body is described for example in Japanese translation of PCT International application publication No. 2015-537337 (JP2015-537337A). This publication No. JP2015-537337A teaches the technique that a separator is provided, on each of its front and rear surfaces, with a bonding layer. Further, a positive electrode plate and a negative electrode plate are attached one to each of those boding layers.

In the above method, the positive electrode plate, the negative electrode plate, and the separator are integrally formed in advance, and thus the electrode body can be easily manufactured. However, this method additionally requires a process for providing the bonding layers before laminating (stacking) the positive electrode plate, the negative electrode plate, and the separator. This process causes a problem of requiring longer time for manufacturing the electrode body.

The present disclosure has been made for the purpose of solving the above problem of the related art. Specifically, the problem to be solved by the present disclosure is to provide a method of manufacturing an electrode body by attaching electrode plates to separators in a short time and to provide the thus formed electrode body.

SUMMARY

A manufacturing method of an electrode body according to one aspect of the present disclosure for solving the above problem is a manufacturing method of an electrode body formed by laminating a positive electrode plate and a negative electrode plate by interposing a separator therebetween, wherein one of the positive electrode plate and the negative electrode plate is a first electrode plate and an other one is a second electrode plate, and the manufacturing method includes: a charging step of electrically charging at least one of the first electrode plate and the separator at an electric potential enough to generate an attraction force between the first electrode plate and the separator; a first laminating step of bringing the first electrode plate and the separator, at least one of which is charged, into direct contact such that the first electrode plate and the separator are attached to each other to form a laminated body; and a second laminating step of laminating the second electrode plate on the laminated body to form the electrode body.

According to the manufacturing method of the electrode body of the present disclosure, at least one of the first electrode plate and the separator is electrically charged in the charging step, and the first electrode plate and the separator are attached to each other by static electricity to form an integral laminated body in the first laminating step. Accordingly, the second laminating step of laminating the laminated body and the second electrode plate can be easily performed. Further, this attachment of the separator and the first electrode plate makes it hard for the electrode body to be separated. The charging step is no longer a time-consuming process and can be performed in a short time. Accordingly, the electrode body can be manufactured in a short time by attaching the electrode plates and the separator.

DETAILED DESCRIPTION OF THE EXEMPLARY EMBODIMENTS

A best mode for exemplifying the present disclosure is now explained below with reference to the accompanying drawings.

Figure 1:
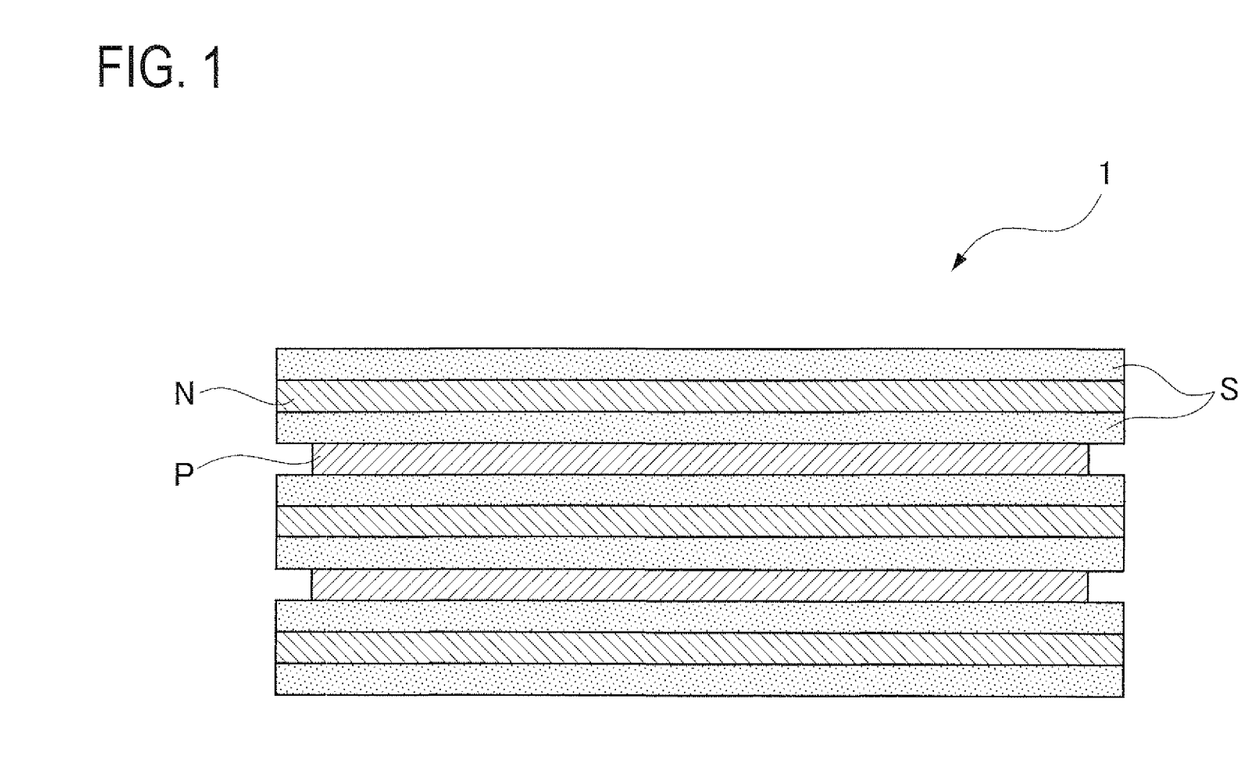
FIG. 1 is a cross-sectional view of an electrode body.

An electrode body 1 manufactured in the present embodiment is firstly explained with reference to FIG. 1. The electrode body 1 is, as shown in FIG. 1, formed by laminating or stacking positive electrode plates P, negative electrode plates N, and separators S flatwise. In the electrode body 1, the positive electrode plates P and the negative electrode plates N are overlapped one on another with the separators S interposed individually therebetween. The electrode body 1 of the present embodiment is used for a lithium ion secondary battery. Specifically, the electrode body 1 is to be housed in a battery case with an electrolyte including lithium salt to manufacture the lithium ion secondary battery.

The separators S are porous resin sheets. Material for the separators S may include, for example, polyethylene (PE), polypropylene (PP), polytetrafluoroethylene (PTFE), aramid, polyimide (PI).

Figure 2:
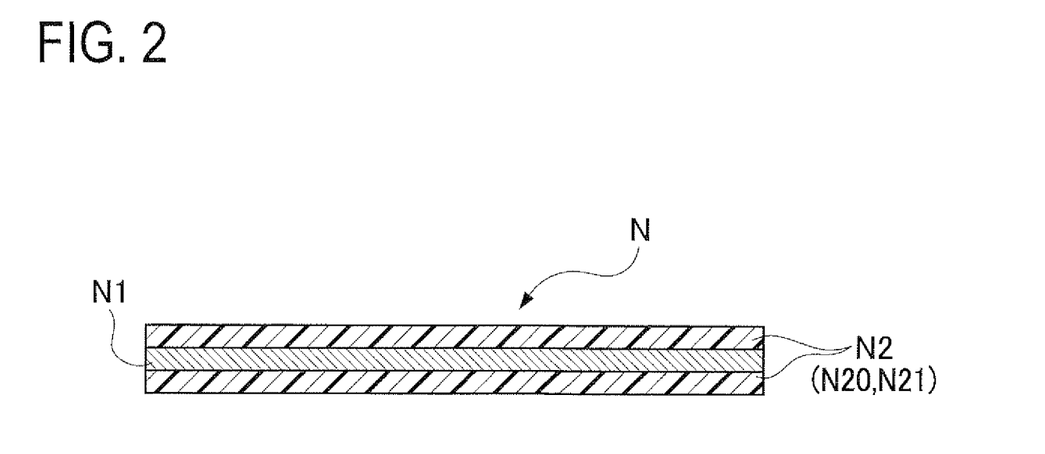
FIG. 2 is a cross-sectional view of a negative electrode plate of the electrode body.

Each negative electrode plate N includes a negative current collecting foil N1 having front and rear surfaces, each surface being formed with a negative active material layer N2 as shown in FIG. 2. The negative current collecting foil N1 is a copper foil in the present embodiment. Further, each negative active material layer N2 includes at least a negative active material N20 and a binder N21.

Figure 3:
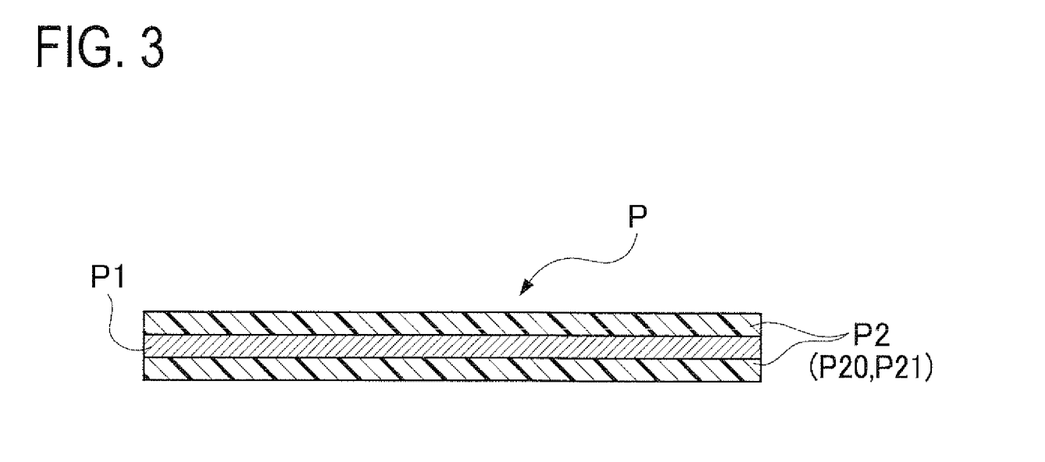
FIG. 3 is a cross-sectional view of a positive electrode plate of the electrode body.

Each positive electrode plate P includes a positive current collecting foil P1 having front and rear surfaces, each surface being formed with a positive active material layer P2 as shown in FIG. 3. The positive current collecting foil P1 of the present embodiment is an aluminum foil. Further, each positive active material layer P2 includes at least a positive active material P20 and a binder P21. Accordingly, in the electrode body 1 of the present embodiment, each of the front and rear surfaces of each separator S is contacted with the positive active material layer P2 of the adjacent positive electrode plate P or the negative active material layer N2 of the adjacent negative electrode plate N.

Materials for the binders N21 and P21 may include, for example, polyamide (PA), polyvinylidene fluoride (PVdF), styrene-butadiene rubber (SBR), polyvinyl alcohol (PVA), and polyvinyl chloride (PVC). In the present embodiment, both the binders N21 and P21 are made of materials easier to be positively charged than the separator S.

Figure 4:
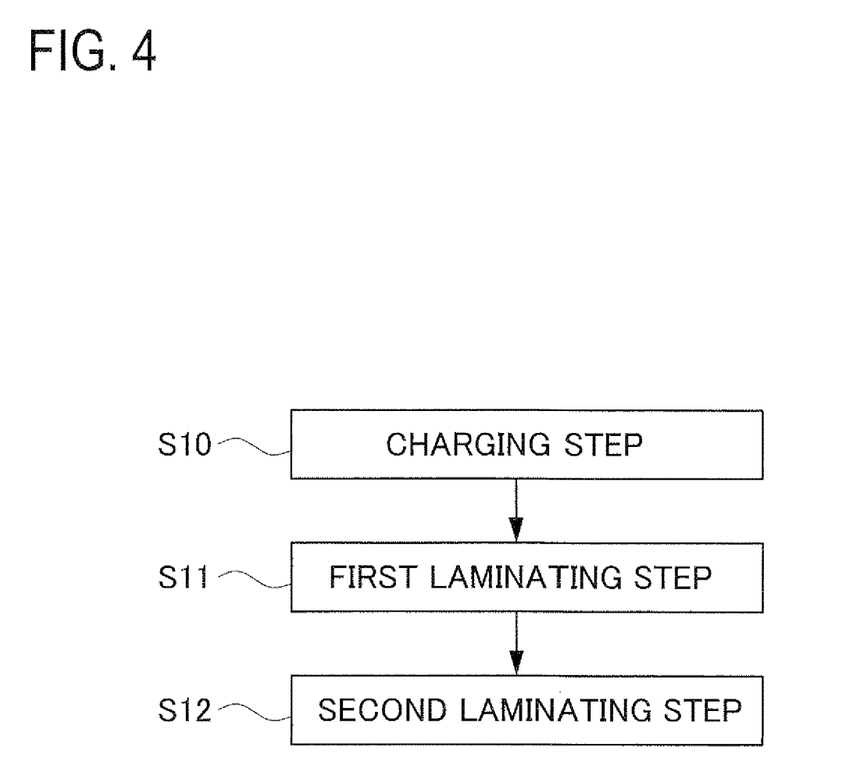
FIG. 4 is a flowchart showing a process of manufacturing the electrode body.

A manufacturing method of the electrode body 1 in the present embodiment is now explained. In the present embodiment, the electrode body 1 is manufactured according to a process shown in FIG. 4. Namely, the electrode body 1 is manufactured by a charging step (S10), a first laminating step (S11), and a second laminating step (S12) which are carried out in this order.

Figure 5:
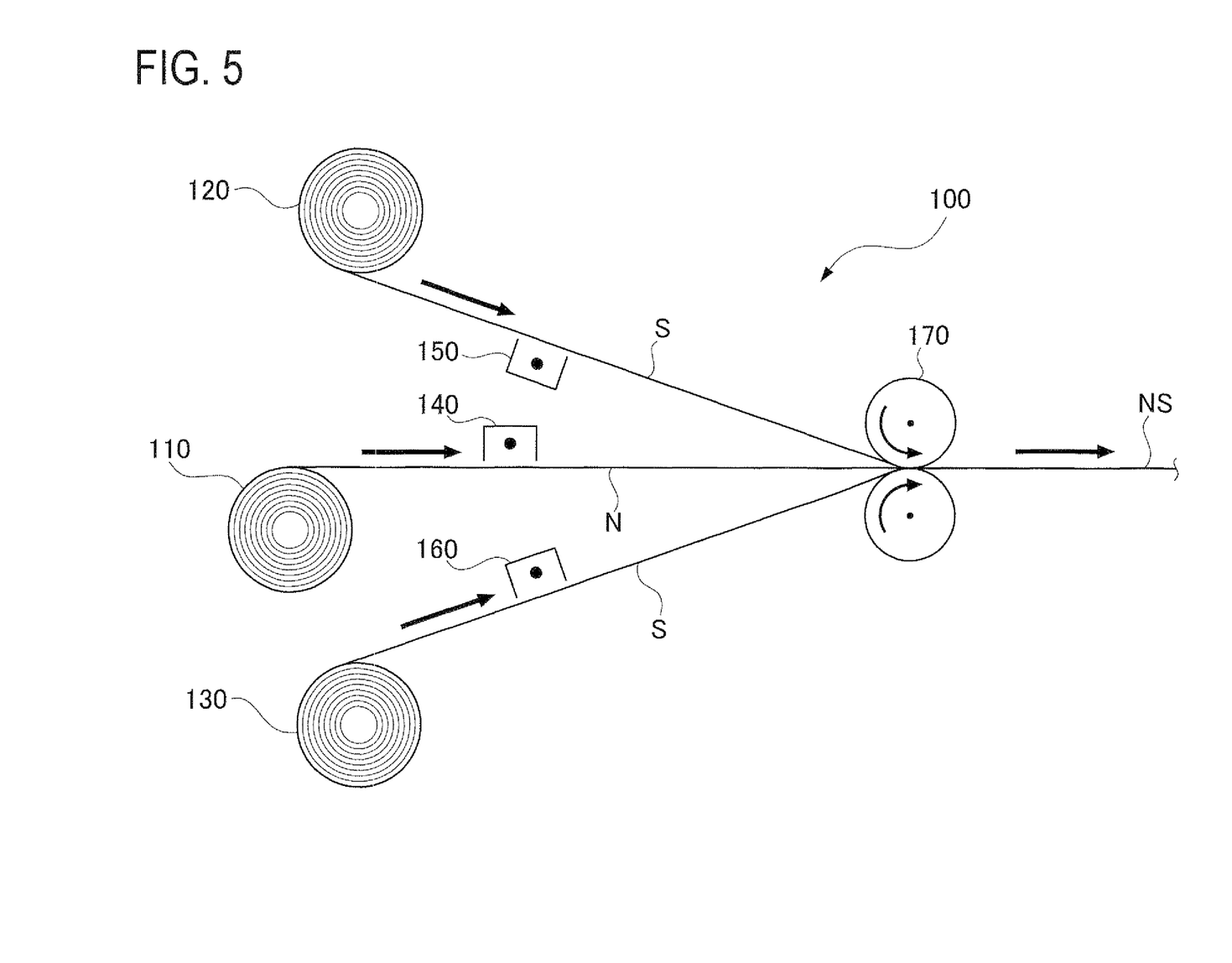
FIG. 5 is a schematic configurational view of a charging and laminating apparatus.

FIG. 5 shows a schematic configurational view of a charging and laminating apparatus 100 configured to perform the charging step (S10) and the first laminating step (S11) in the present embodiment. The charging and laminating apparatus 100 is provided with a negative electrode plate feeding part 110 and separator feeding parts 120 and 130. In the negative electrode plate feeding part 110, the long sheet-shaped negative electrode plate N wound in a roll shape is set. The negative electrode plate N is to be wound off and supplied into the charging and laminating apparatus 100. In each of the separator feeding parts 120 and 130, the long sheet-shaped separator S wound in a roll shape is set. Each separator S is to be wound off and supplied into the charging and laminating apparatus 100.

On a conveyance path to convey the negative electrode plate N wound off from the negative electrode plate feeding part 110, there are provided a negative electrode plate charging part (also referred to as a "first charging part") 140 and a pair of laminating rollers 170 in this order. The first charging part 140 is a charger for charging the negative electrode plate N by corona discharge method. The first charging part 140 is configured to apply a positive electric charge to the negative electrode plate N. To be specific, the first charging part 140 is configured to positively charge the binder N21 included in the negative active material layer N2 of the negative electrode plate N. Accordingly, the negative electrode plate N having passed through the first charging part 140 is charged positively. This positively-charged negative electrode plate N having passed through the first charging part 140 is then made to pass through between the pair of the laminating rollers 170 placed opposite each other.

On a conveyance path of the separator S wound off from the separator feeding part 120, there is provided a separator charging part (also referred to as a "second charging part") 150. On a conveyance path of the separator S wound off from the separator feeding part 130, there is provided a separator charging part (also referred to as a "third charging part") 160. Both the second and third charging parts 150 and 160 are chargers to charge the separators S by corona discharge. Further, the second and third charging parts 150 and 160 of the present embodiment are each configured to apply a negative electric charge to the corresponding separator S. Accordingly, each separator S having passed through the second charging part 150 or the third charging part 160 is negatively charged. The thus negatively charged separators S having passed through the second charging part 150 or the third charging part 160 are then made to pass through between the pair of the opposite laminating rollers 170.

The negative electrode plate N and the two separators S are overlapped one on another and laminated in an opposite position in which the laminating rollers 170 are opposed to each other. This laminating of the negative electrode plate N and the two separators S is made such that two separators S hold or sandwich therebetween the negative electrode plate N as shown in FIG. 5. Namely, in the opposite position of the pair of the laminating rollers 170, the separators S are each laminated on each of front and rear surfaces of the negative electrode plate N. Herein, nothing is interposed between the negative electrode plate N and the separators S. Both the front and rear surfaces of the negative electrode plate N are therefore directly contacted with the separators S in the opposite position of the pair of the laminating rollers 170.

Figure 6:
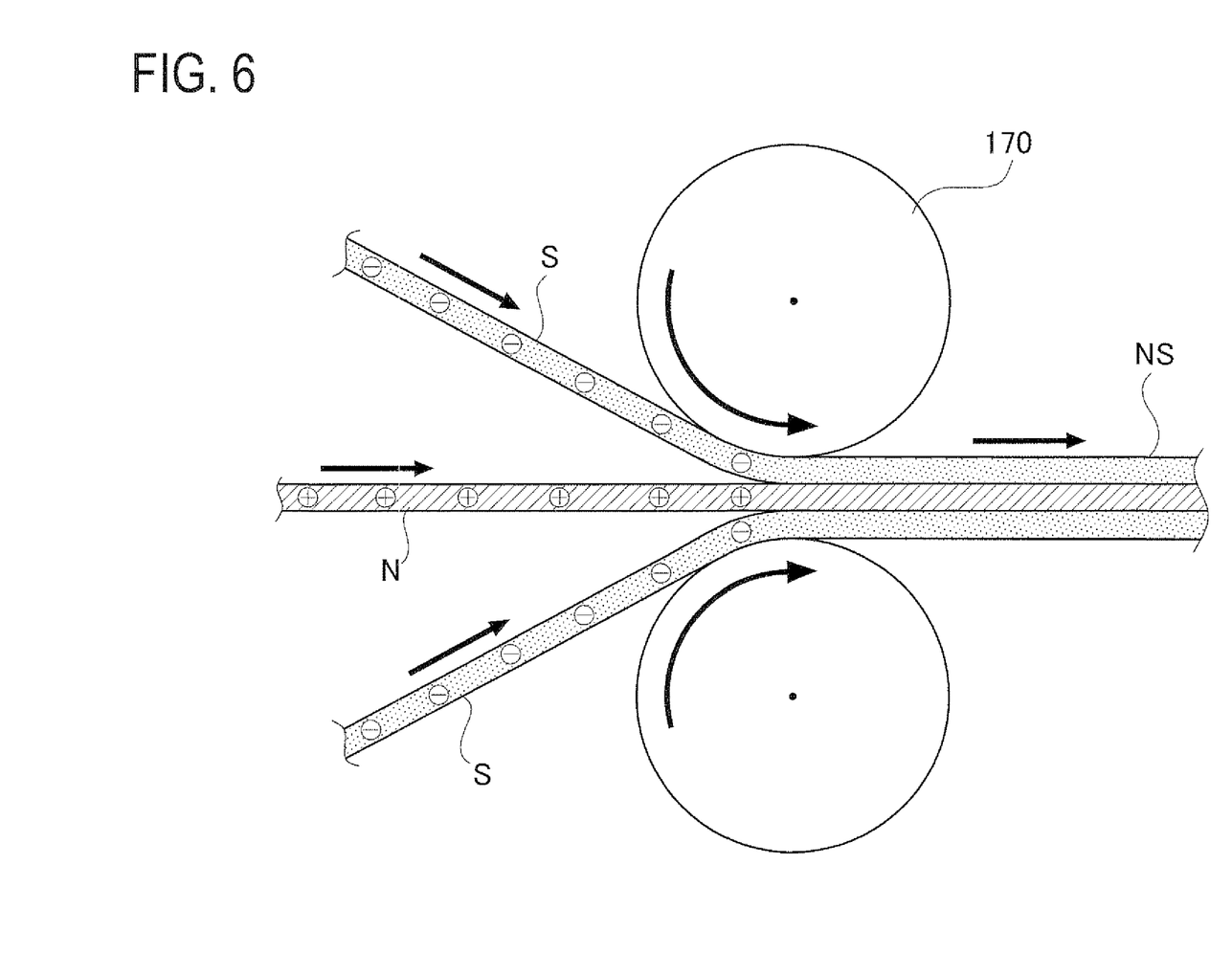
FIG. 6 is an enlarged view of a part of the charging and laminating apparatus, showing a pair of laminating rollers facing each other.

FIG. 6 is an enlarged view of the charging and laminating apparatus 100 in the opposite position of the pair of the laminating rollers 170. These laminating rollers 170 are configured to rotate and press the separators S against the front and rear surfaces of the negative electrode plate N in a thickness direction so that the negative electrode plate N and the separators S are pressurized. The negative electrode plate N and the separators S when arrive at the laminating rollers 170 have already been charged as mentioned above.

To be more specific, after the negative electrode plate N and the two separators S are charged to have opposite polarities from each other, they are laminated in the opposite position of the pair of the laminating rollers 170 as shown in FIG. 6. Thus, the two separators S are each overlapped on the front and rear surfaces of the negative electrode plate N, that is charged oppositely from the separators S and attached to the negative electrode plate N by attraction force of static electricity.

As a result of this, the negative electrode plate N and the two separators S both having passed through the opposite position of the pair of the laminating rollers 170 adhere to each other, so that a laminated body NS is integrally formed. In this laminated body NS, the negative electrode plate N and the separators S are oppositely charged from each other, thus generating an attraction force to attract each other. Accordingly, the laminated body NS has a configuration that the negative electrode plate N and the separators S are hard to separate from each other.

The charging and laminating apparatus 100 carries out the charging step (S10) to charge the negative electrode plate N and the two separators S respectively by the first charging part 140 and the second and third charging parts 150 and 160. The charging and laminating apparatus 100 further carries out the first laminating step (S11) to form the laminated body NS by directly contacting and attaching the two charged separators S to the charged negative electrode plate N by use of the pair of the laminating rollers 170. As the first charging part 140 and the second and third charging parts 150 and 160, a corona charging gun manufactured by Green Techno Inc., may be used, for example.

Figure 7:
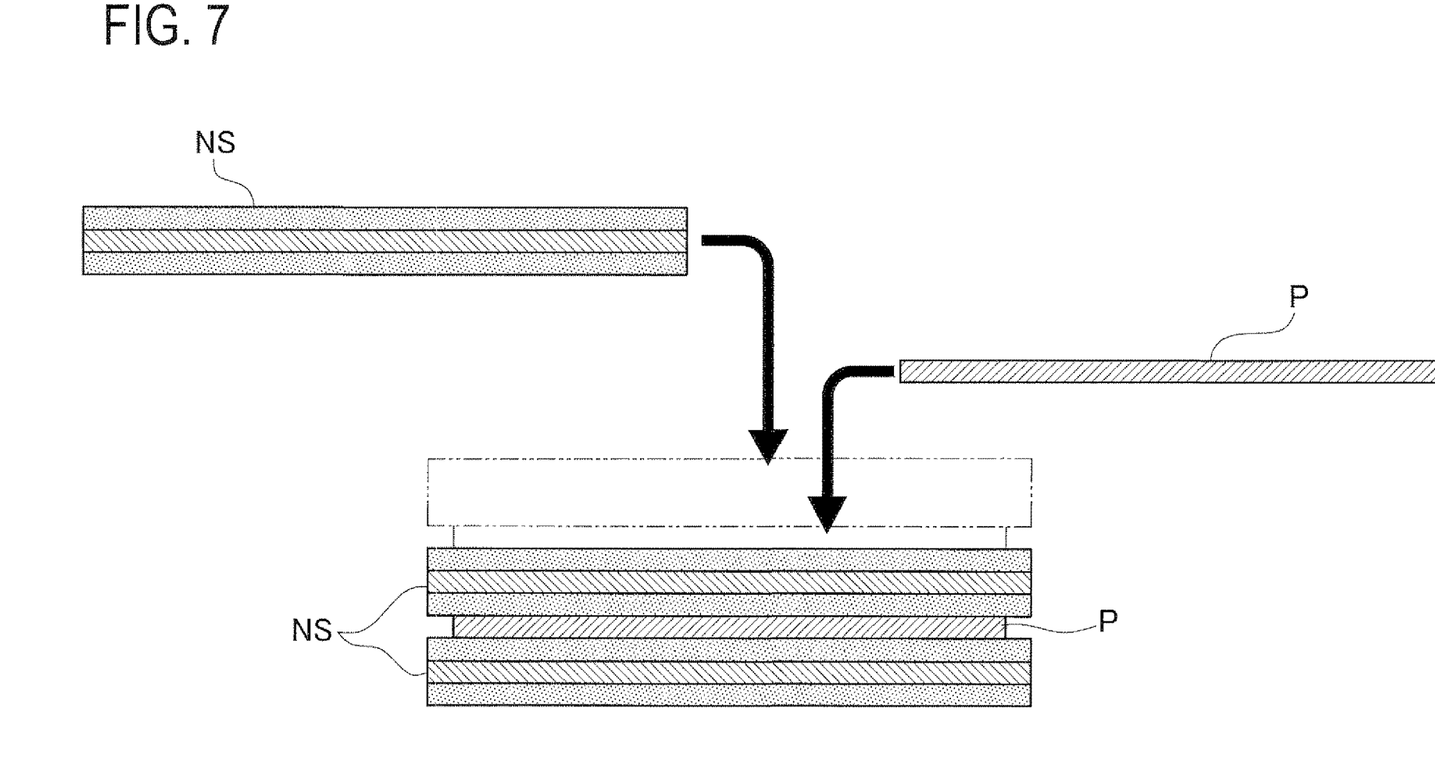
FIG. 7 is a view for explaining a second laminating step.

Subsequently, the second laminating step (S12) is carried out. FIG. 7 is a view for explaining the second laminating step. As shown in FIG. 7, in the second laminating step, the laminated body NS fabricated by the charging and laminating apparatus 100 and the positive electrode plate P are used. The laminated body NS used in the second laminating step is the one having been manufactured by the charging and laminating apparatus 100 and cut into pieces of a predetermined size suitable for the electrode body 1. The positive electrode plate P has also been cut into pieces of a predetermined size suitable for the electrode body 1.

As shown in FIG. 7, the laminated body pieces NS and the positive electrode plate pieces P are alternately overlapped one on another in the second laminating step. The laminated body NS is formed by laminating the separators S one on each of the front and rear surfaces of the negative electrode plate N as mentioned above. In the second laminating step, therefore, the laminated body pieces NS and the positive electrode plate pieces P are alternately laminated one on another as shown in FIG. 7. In the above manner, the electrode body 1 shown in FIG. 1 is manufactured. In the thus manufactured electrode body 1, the negative electrode plate N has been positively charged and the separators S have been negatively charged, and those negative electrode plate N and the separators S are in direct contact with each other.

Further, as mentioned above, the laminated body NS is formed such that the negative electrode plate N and the separators S adhere to each other by the static electricity, making it hard to separate the negative electrode plate N and the separators S. In other words, the laminated body NS is integrally formed and prevented from causing displacement in the negative electrode plate N and the separators S. As a result of this, in the second laminating step, the laminated body NS and the positive electrode plate P only have to be aligned their positions for laminating. Laminating the laminated body NS and the positive electrode plate P can be thus made easily in a short time in the present embodiment.

Further, in the present embodiment, the laminated body NS is fabricated easily in a short time by charging and overlapping the negative electrode plate N and the two separators S in the charging step and the first laminating step. Accordingly, the electrode body 1 can be easily manufactured in a short time in the present embodiment.

Another method of attaching the negative electrode plate to the separators besides the method of the present embodiment is to provide bonding layers for bonding the negative electrode plate and the separators. However, for providing the bonding layers, another step and another device are required, and thus the time for manufacturing the electrode body is longer and the manufacturing cost is higher than in the present embodiment.

When no bonding layers are provided and thus the negative electrode plate and the separators are not attached for manufacturing the electrode body, the negative electrode plate and the separators are easy to be separated. To prevent separation, all the positive electrode plate, the negative electrode plate, and the separators to form the electrode body need to be precisely aligned their positions in laminating to form the electrode body. The more the number of components to be precisely positioned increases, the longer the time for alignment takes. Furthermore, when the laminated components forming the electrode body are not bonded together, any action for preventing separation of the manufactured electrode body needs to be taken thereafter. In other words, any prevention means to prevent separation or detachment of the electrode body needs to be taken during conveyance of the manufactured electrode body and mounting of the electrode body in a battery. Therefore, even when the electrode body is manufactured without attaching the negative electrode plate to the separators, the time required for manufacturing the electrode body takes longer than the present embodiment, and the manufacturing cost is also increased. On the contrary, in the present embodiment, the electrode body can be manufactured inexpensively in a short time.

Further, in the first laminating step of the present embodiment, electric discharge occurs between the negative electrode plate N and the separator S which are contacted each other. This is because there is a potential difference between the negative electrode plate N and the separator S charged in the charging step. In the laminated body NS, when the discharge voltage between the negative electrode plate N and the separator S made to contact in the first laminating step is large, the attraction force becomes large.

Figure 8:
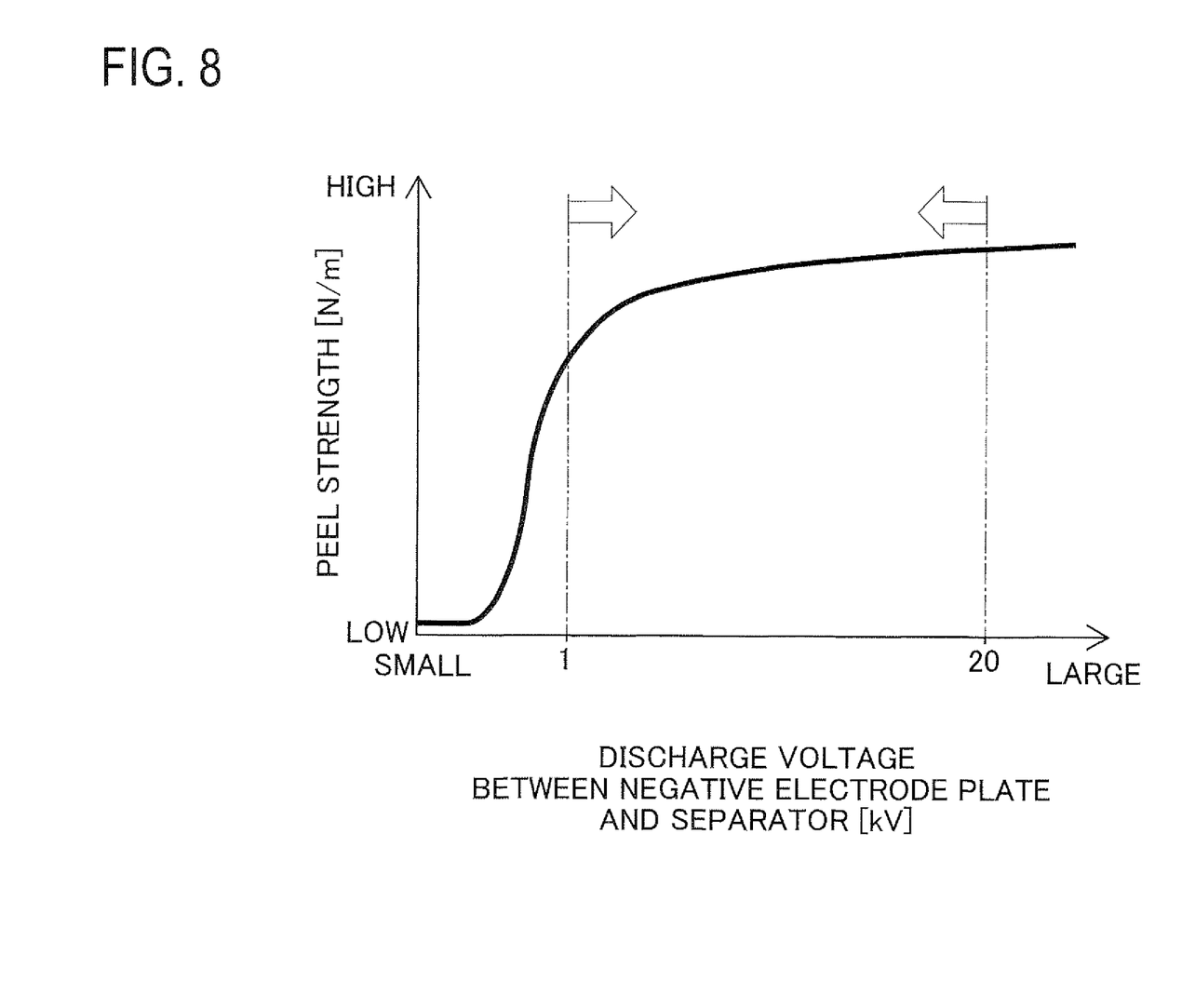
FIG. 8 is a graph showing a relation of a discharge voltage and a peel strength between a negative electrode plate and a separator.

FIG. 8 is a graph showing a relation between a discharge voltage generated between the negative electrode plate N and the separator S when they are brought into contact in the first laminating step and a peel strength between the negative electrode plate N and the separator S which have adhered to each other by the attraction force generated by the static electricity. The peel strength is obtained from a measured value of a peeling force that is measured by a test of peeling off the separator S, which has adhered to the surface of the negative electrode plate N by the static electricity, from the surface of the negative electrode plate N.

As shown in FIG. 8, the peel strength tends to be high when the discharge voltage between the negative electrode plate N and the separator S is large. Higher peel strength is preferable since the laminated body NS is harder to be separated as the peel strength is higher. The graph of FIG. 8 indicates that the peel strength is not so high when the discharge voltage is less than 1 kV. Accordingly, it is preferable to carry out the charging step such that the discharge voltage between the negative electrode plate N and the separator S which are to be contacted in the first laminating step becomes 1 kV or more. Thus, the laminated body NS is surely made hard to be separated. It is more preferable to carry out the charging step such that the discharge voltage becomes 5 kV or more, and still more preferably, the discharge voltage become 10 kV or more. This can make the laminated body NS harder to be separated.

On the other hand, the higher the discharge voltage between the negative electrode plate N and the separator S contacted in the first laminating step becomes, the higher the possibility of causing damage to the negative electrode plate N and the separator S at the time of discharging becomes. The damage to the negative electrode plate N and the separator S is appropriately prevented by regulating the discharge voltage between the negative electrode plate N and the separator S contacted in the first laminating step to be equal to or less than 20 kV in the charging step. It is more preferable to carry out the charging step such that the discharge voltage becomes 17 kV or less, and still more preferably, the discharge voltage becomes 15 kV or less. This can surely prevent the damage to the negative electrode plate N and the separator S.

It is therefore preferable to carry out the charging step such that the discharge voltage between the negative electrode plate N and the separator S contacted in the first laminating step falls within a range of 1 kV to 20 kV as indicated with white arrows in FIG. 8. The laminated body NS is thus made hard to be separated, and the damage to the negative electrode plate N and the separator S can be prevented. Herein, the discharge voltage indicated in FIG. 8 is calculated by measuring each value of the electric potentials of the negative electrode plate N and the separator S, both of which are charged in the charging step, by use of STATIRON DX by Shishido Electrostatic, Ltd.

Further, it is also preferable to charge the positive electrode plate P in advance of the second laminating step. Specifically, the positive electrode plate P is preferably charged to the electric potential high enough to generate the attraction force with the laminated body NS, and the thus charged positive electrode plate P is laminated to form the electrode body 1. For example, there is a case that the laminated body NS is kept charged even after discharged at the time of laminating in the first laminating step. When the laminated body NS is kept charged even after the first laminating step, the positive electrode plate P may be charged oppositely from the laminated body NS. The laminated body NS and the charged positive electrode plate P may be laminated in the second charging step to manufacture the electrode body 1. Owing to the thus charged positive electrode plate P, the electrode body 1 can be fabricated with the positive electrode plate P, the negative electrode plate N, and the separator S, all of which are attached by the attraction force of the static electricity. Namely, the electrode body 1 can be made harder to be separated. Further, the electrode body 1 with all the laminated components made hard to be separated can be manufactured inexpensively in a short time.

It is also preferable to carry out the second laminating step such that at least any one of the laminated body NS and the positive electrode plate P is adjusted its charged potential to generate the discharge voltage of 1 kV or more between the laminated body NS and the positive electrode plate P in contacting. This adjustment increases the peel strength between the positive electrode plate P and the separator S and makes the electrode body 1 surely harder to be separated. Further, it is more preferable to adjust the discharge voltage to 5 kV or more in the step of adjusting the potential in advance of the second laminating step, and still more preferably, to 10 kV or more. The electrode body 1 can be thus made even harder to be separated.

The second laminating step is also preferably carried out such that at least any one of the laminated body NS and the positive electrode plate P is adjusted its charged potential to generate the discharge voltage of 20 kV or less between the laminated body NS and the positive electrode plate P in contacting. The positive electrode plate P and the separator S can be thus properly prevented from getting damaged. In the step of adjusting the electric potential in advance of the second laminating step, it is preferable to adjust the discharge voltage to 17 kV or less, and more preferably, to 15 kV or less. This adjustment further surely prevents damages to the positive electrode plate P and the separator S.

Namely, the second laminating step is also preferably carried out on condition that the discharge voltage between the laminated body NS and the positive electrode plate P falls within a range from 1 kV to 20 kV inclusive.

Further, as mentioned above, the negative electrode plate N and the separator S are oppositely charged from each other in the charging step. However, both the negative electrode plate N and the separator S do not necessarily need to be charged. At least any one of the negative electrode plate N and the separator S may be charged as long as the attraction force caused by the static electricity is generated between the negative electrode plate N and the separator S. In this case, it is more preferable to charge the separator S rather than charging the negative electrode plate N in the charging step. This is because an entire body of the separator S is an insulator, and thus easier to be charged than the negative electrode plate N. Further, when any one of the negative electrode plate N and the separator S is charged, the other one that is not to be charged may be removed its electrostatic charges in advance of the first laminating step. Thus, the difference in the potentials of the negative electrode plate N and the separator S can be surely regulated. However, the most preferable example is to charge both the negative electrode plate N and the separator S in the opposite polarity as mentioned above. This is because the adherence force by the static electricity between the negative electrode plate N and the separator S can be made larger and the laminated body NS can be made harder to be separated than the example of charging either one of the negative electrode plate N or the separator S.

In the above example, the separators S are concurrently laminated on the front and rear surfaces of the negative electrode plate N in the first laminating step. However, when only one of the front and rear surfaces of the negative electrode plate N needs to be adhered with the separator S, the separator S may be laminated only on a relevant one of the surfaces. Even when the separators S are to be laminated on both front and rear surfaces of the negative electrode plate N, the separators S may be laminated on the surfaces one after the other instead of simultaneous lamination on both the surfaces.

Further, in the above example, the negative electrode plate N and the separators S are laminated in the first laminating step. Alternatively, the positive electrode plate P and the separators S may be laminated in the first laminating step. In this example, the laminated body formed by laminating the positive electrode plate P and the separators S can be laminated with the negative electrode plate N in the second laminating step.

The present applicant carried out examples 1 to 8 according to the present embodiment. Firstly, in each of the examples 1 to 8, a laminated body is fabricated by laminating separators on front and rear surfaces of a negative electrode plate in the charging step and the first laminating step. Conditions for fabricating the laminated bodies in the examples 1 to 8 are indicated in the following table 1.

TABLE 1

| | | Laminated body | | |
|---|---|---|---|---|
| | Attachment method | Charge potential of negative electrode plate [kV] | Charge potential of separator [kV] | Discharge voltage in laminating [kV] |
| Example 1 | Static electricity | 1 | −1 | 3 |
| Example 2 | Static electricity | 2 | −2 | 6 |
| Example 3 | Static electricity | 3 | −3 | 9 |
| Example 4 | Static electricity | 5 | −5 | 15 |
| Example 5 | Static electricity | — | −1 | 2 |
| Example 6 | Static electricity | — | −1 | 2 |
| Example 7 | Static electricity | — | −0.5 | 1 |
| Example 8 | Static electricity | 10 | −5 | 20 |

As shown in the table 1, in each of the examples 1 to 8, the laminated body is fabricated by attaching the separators on both front and rear surfaces of the negative electrode plate by the static electricity. In the examples 1 to 8, identical negative electrode plates and identical separators are used. The negative electrode plates and the separators used in the examples 1 to 8 are to be used for manufacturing lithium ion secondary batteries.

Specifically, the separators used herein are made of PE. The negative electrode plate is formed by placing a negative active material layer on a copper foil as a negative current collecting foil. The negative active material layer is formed by natural graphite as a negative active material and SBR as a binder. The negative active material layer is specifically formed by coating a negative electrode paste including a solvent, in which the negative active material and the binder are dispersed, on the copper foil and then drying the thus coated negative electrode paste. The negative electrode paste further contains carboxymethyl cellulose (CMC) added as a thickener.

As shown in the table 1, in the examples 1 to 4 and 8, each negative electrode plate is applied with the positive electric charge in the charging step. In all the examples 1 to 8, each separator is applied with the negative electric charge. Namely, in each of the examples 1 to 4, and 8, the negative electrode plate and the separator are oppositely charged in the charging step. On the other hand, in the examples 5 to 7, only the separators are charged in the charging step. In the present examples, electric potential of each of the negative electrode plate and others is indicated based on a ground potential as a reference value.

The table 1 further indicates a discharge voltage V1 when the two separators are laminated on the negative electrode plate. The discharge voltage V1 at the time of laminating the laminated body is obtained by the following formula (1): $V1=|Vn-(Vs*2)|$ (1), wherein Vn represents a charged potential of the negative electrode plate and Vs represents a charged potential of the separator. Vs is multiplied by two in the formula because the two separators are to be laminated onto the negative electrode plate.

In the examples 1 to 8, the laminated body and the positive electrode plate are subsequently laminated flat in the second laminating step, and thus the electrode body is fabricated. Conditions for fabricating the electrode body in the examples 1 to 8 are indicated in the following table 2.

TABLE 2

| | | Electrode body | | |
|---|---|---|---|---|
| | Attachment method | Residual potential of laminated body [kV] | Charge potential of positive electrode plate [kV] | Discharge voltage in laminating [kV] |
| Example 1 | Static electricity | −1 | 1 | 2 |
| Example 2 | Static electricity | −2 | 2 | 4 |
| Example 3 | Static electricity | −3 | 3 | 6 |
| Example 4 | Static electricity | −5 | 5 | 10 |
| Example 5 | Static electricity | −2 | 2 | 4 |
| Example 6 | Static electricity | −2 | — | 2 |
| Example 7 | Static electricity | −1 | 1 | 2 |
| Example 8 | Static electricity | 0 | 1 | 1 |
| Comparative example 1 | N/A | — | — | — |
| Comparative example 2 | Bonding layer | — | — | — |

As indicated in the table 2, in the examples 1 to 8, the electrode body is also fabricated by a method of attachment by the static electricity in the second laminating step. Specifically, the second laminating step is performed in a state in which at least any one of the laminated body and the positive electrode plate is charged to have an electric potential high enough to cause an attraction force with the other one. In the examples 1 to 8, identical positive electrode plates are used. Each positive electrode plate used in the examples 1 to 8 is to be used for manufacturing a lithium ion secondary battery.

The positive electrode plate is, specifically, formed by placing a positive active material layer on an aluminum foil as a positive current collecting foil. The positive active material layer is formed by layered lithium nickel manganese cobalt oxide as the positive active material and PVdF as the binder. The active material layer is formed by coating a positive electrode paste including a solvent, in which the positive active material and the binder are dispersed, and then drying the coated positive electrode paste. Herein, the positive electrode paste further contains carbon black as a conductor for enhancing the conductivity of the positive active material layer.

The residual potential of the laminated body indicated in the table 2 represents the potential of the laminated body which has been laminated in the first laminating step. The residual potential Vns of the laminated body is obtained by the following formula (2): $Vns=Vn+(Vs*2)$ (2), wherein Vn represents a charged potential of the negative electrode plate and Vs represents a charged potential of the separator. Vs is multiplied by two in the formula because the two separators are to be laminated on the negative electrode plate.

The table 2 further indicates a discharge voltage V2 at the time of laminating the laminated body with the positive electrode plate. The discharge voltage V2 in laminating the electrode body is obtained by the following formula (3): $V2=|Vns-Vp|$ (3), wherein Vns represents the residual potential of the laminated body and Vp represents the charged potential of the positive electrode plate.

The table 2 further indicates comparative examples 1 and 2 different from the present embodiment. In the comparative example 1, a positive electrode plate, a negative electrode plate, and a separator are stacked flatwise one on another without applying any method of attachment to fabricate an electrode body. In the comparative example 2, a separator is provided with bonding layers formed in advance on front and rear surfaces of the separator, and the separator provided with the bonding layers are stacked flat one on another with the positive electrode plate and the negative electrode plate to fabricate an electrode body.

The positive electrode plate, the negative electrode plate, and the separator identical to the present examples are used in the comparative examples 1 and 2. Further, in the comparative examples 1 and 2, the electrode body is fabricated without charging the positive electrode plate, the negative electrode plate, and the separator.

Each electrode body of the examples 1 to 8 and the comparative examples 1 and 2 fabricated as mentioned above was subjected to an evaluation test to evaluate a plurality of items mentioned below in order to confirm the effect of the present embodiment.

A first evaluation test is a peeling test for the negative electrode plate and the separator of the electrode body. A second evaluation test is a peeling test for the positive electrode plate and the separator of the electrode body. From those two peeling tests, a peel strength between the negative electrode plate and the separator and a peel strength between the positive electrode plate and the separator are evaluated. Each peeling test is carried out by pulling the separator in a direction vertical to the surface of the electrode plate (the negative electrode plate or the positive electrode plate) and measuring a force at which the separator is separated from the surface of the electrode plate, and then calculating the peel strength based on a measured value.

A third evaluation test is carried out by evaluating self-discharge of each lithium ion secondary battery which is manufactured with the electrode body. The lithium ion secondary battery is manufactured in a manner that the electrode body is accommodated in a battery housing with non-aqueous electrolyte including lithium salts. The manufactured lithium ion secondary battery is finished in a finishing step, the finished lithium ion secondary battery after undergoing the finishing step is left stand for a predetermined period, and then the thus left battery is evaluated its self-discharge at the battery voltage which is obtained after leaving. In the finishing step, the lithium ion secondary battery is initially charged to full charge and then discharged. The evaluation test of the self-discharge includes a first leaving step of leaving the battery having been charged to 4.1 V after the finishing step to stand for 24 hours under an environment of 60° C. and a second leaving step of leaving the battery to stand for 120 hours under an environment of 25° C. in the order of first to second steps. A lithium ion secondary battery with the battery voltage of 3.1 V or less after the second leaving step is evaluated as failure in the self-discharge evaluation.

A forth evaluation test is carried out by measuring a reactive impedance of each lithium ion secondary battery. This measurement of the reactive impedance is made for each lithium ion secondary battery having been adjusted its SOC (State of Charge) to 50% after the self-discharge evaluation. To be more specific, the lithium ion secondary battery or batteries adjusted its SOC to 50% are subjected to measurement of impedance under the environment of −30° C., and the reactive impedance is obtained based on the Nyquist diagram from the measured impedance.

The following table 3 indicates evaluation results of the examples 1 to 8 and the comparative examples 1 and 2.

TABLE 3

| | Electrode body | | Battery | |
|---|---|---|---|---|
| | Peel strength between negative electrode plate and separator [N/m] | Peel strength between positive electrode plate and separator [N/m] | Self-discharge evaluation | Reactive impedance [Ω] |
| Example 1 | 1.3 | 1 | Good | 100 |
| Example 2 | 1.7 | 1.45 | Good | 100 |
| Example 3 | 1.9 | 1.7 | Good | 100 |
| Example 4 | 1.93 | 1.7 | Good | 100 |
| Example 5 | 1 | 1.45 | Good | 100 |
| Example 6 | 1 | 1 | Good | 100 |
| Example 7 | 0.6 | 1 | Good | 100 |
| Example 8 | 2.29 | 0.6 | Good | 100 |
| Comparative example 1 | — | — | Failure | 100 |
| Comparative example 2 | 1 | 1 | Good | 150 |

As indicated in the table 3, the electrode body of the comparative example 1 could not be measured its peel strength since the positive electrode plate, the negative electrode plate, and the separator are not originally attached to each other. The electrode body of the comparative example 2 is formed by boding by use of the bonding layers, and thus the peel strength between the negative electrode plate and the separator and the peel strength between the positive electrode plate and the separator are both considered to be high enough. However, the comparative example 2 needs an equipment for providing the bonding layers, increasing a manufacturing cost for the electrode body and taking long time for manufacturing the electrode body due to an additional step of providing the bonding layers.

In each of the examples 1 to 8, both the peel strength between the negative electrode plate and the separator and the peel strength between the positive electrode plate and the separator are high enough. Further, in each of the examples 1 to 8, the charging step and the first laminating step of laminating the negative electrode plate with the separator to fabricate the laminated body can be performed in a short time with an inexpensive configuration. Furthermore, the second laminating step of laminating the laminated body with the positive electrode plate to fabricate the electrode body can also be performed in a short time with an inexpensive configuration.

In the comparative example 1, the reactive impedance of the lithium ion secondary battery is low, but the result of the self-discharge evaluation is not good. This failure in the self-discharge in the comparative example 1 is considered to be caused by reasons such as displacement in each component forming the electrode body and a clearance formed between the adjacent components since the positive electrode plate, the negative electrode plate, and the separator are not attached to one another in the electrode body.

In the comparative example 2, components of the electrode body are fixed to one another with bonding layers, and thus displacement in each component and creation of clearance between the adjacent components can be prevented. Accordingly, the comparative example 2 shows a good result in the self-discharge evaluation.

However, in the comparative example 2, the reactive impedance is high. This high impedance is considered to be caused by providing the bonding layers. Namely, when the electrode plate of the lithium ion secondary battery is charged and discharged, lithium ions are transferred between the active material layer and the electrolyte. The active material layer therefore preferably contacts with the electrolyte not only on the surface of the active material layer but also in its internal voids or gaps. This is because a large reaction area of the active material layer with the electrolyte leads to low impedance. However, in the comparative example 2, one side of the bonding layer is bonded to the separator and the other side is bonded to the active material layer of the positive electrode plate or the negative electrode plate. The bonding layer sticks to the surface of the active material layer of the positive electrode plate or the negative electrode plate and further covers the surface of the active material layer. Moreover, the bonding layer not only covers the surface of the active material layer but also enters into the internal voids of the active material layer when the bonding layer is bonded to the active material layer. This covering and intrusion of the bonding layer results in reducing the reaction area of the active material layer with the electrolyte. This is conceivably the reason why the comparative example 2 using the bonding layer is high in the reactive impedance.

In all the examples 1 to 8, the result of the self-discharge evaluation is good. This is because the components of the electrode body in the examples 1 to 8 are fixed to each other by the static electricity, and thus displacement between the components and creation of a clearance between the components can be prevented.

In all the examples 1 to 8, the reactive impedance of the lithium ion secondary battery is low. In each of the examples 1 to 8, the components of the electrode body adhere to one another by the attraction force generated by the static electricity. Therefore, the reaction area of the active material layer and the electrolyte in each of the examples 1 to 8 is not reduced, differently from the comparative example 2, and the reaction area can be large enough in the examples 1 to 8.

Accordingly, the examples according to the present disclosure reveal that manufacturing of the electrode body by attaching the electrode plate and the separator in a short time can be achieved. Further, the examples according to the present disclosure reveal that manufacturing of the electrode body can be achieved inexpensively. Furthermore, the examples of the present disclosure reveal that manufacturing of the lithium ion secondary battery with improved self-discharge evaluation results and low reactive impedance by use of the electrode body can be achieved inexpensively in a short time.

As explained in detail above, in the present embodiment, the electrode body 1 is manufactured by the charging step, the first laminating step, and the second laminating step. In the charging step, at least any one of the negative electrode plate N and the separators S is charged to have the electric potential high enough to generate the attraction force between the negative electrode plate N and the separators S. In the first laminating step, the negative electrode plate N and the separators S, at least any one of which is charged, are laminated in direct contact relation to form the laminated body NS in which those negative electrode plate N and the separators S are attached to each other. In the second laminating step, the positive electrode plate P is laminated on the laminated body NS to form the electrode body 1. In the charging step and the first laminating step, the negative electrode plate N and the separators S are attached in a short time by the static electricity. In the thus manufactured electrode body, at least any one of the negative electrode plate N and the separators S is charged to have the potential high enough to generate the attraction force between the negative electrode plate N and the separators S, and the negative electrode plate N and the separators S are directly contacted. Accordingly, it is realized an electrode body and a method of manufacturing the electrode body manufactured by attaching the electrode plate and the separators in a short time.

The present embodiment is only an illustration and does not give any limitation to the present disclosure. Accordingly, various changes and modifications may be made without departing from the scope of the disclosure. For example, polarity of charging the negative electrode plate, the separator, and others may be reversed from the above embodiments. Namely, the separator may be positively charged and the negative electrode plate may be negatively charged in the charging step. In this case, as a binder of the negative electrode plate, material easier to be charged with the negative electric charge than the separator may be used.

The above embodiment is explained with applying the present disclosure to an electrode body of a lithium ion secondary battery. However, the present disclosure may be applied not only to the lithium ion secondary battery but also to other types of batteries, such as a nickel-hydrogen battery.

In the above method of manufacturing an electrode body, preferably, the charging step includes charging the first electrode plate and the separator to be contacted in the first laminating step at a discharge voltage falling within a range of 1 kV to 20 kV. This is because setting the discharge voltage between the first electrode plate and the separator to 1 kV or more can make the laminated body formed by attaching the electrode plate and the separator surely hard to be separated. Further, another reason is because setting the discharge voltage between the first electrode plate and the separator to 20 kV or less can appropriately prevent damage to the first electrode plate and the separator.

Another embodiment of the present disclosure is to provide an electrode body including a positive electrode plate and a negative electrode plate laminated with a separator interposed therebetween, in which one of the positive electrode plate and the negative electrode plate is a first electrode plate, at least one of the first electrode plate and the separator is charged to an electric potential enough to generate the attraction force between the first electrode plate and the separator, and the first electrode plate and the separator are directly contacted.

REFERENCE SIGNS LIST

1 Electrode body
100 Charging and laminating apparatus
140 Negative electrode plate charging part (First charging part)
150,160 Separator charging part (Second and Third charging parts)
170 Pair of laminating rollers
N Negative electrode plate
NS Laminated body
P Positive electrode plate
S Separator

What is claimed is:

1. A manufacturing method of an electrode body formed by laminating a positive electrode plate and a negative electrode plate by interposing a separator therebetween, wherein one of the positive electrode plate and the negative electrode plate is a first electrode plate and an other one is a second electrode plate, and the manufacturing method includes:

a charging step of electrically charging at least the first electrode plate at an electric potential enough to generate an attraction force between the first electrode plate and the separator;

a first laminating step of bringing the first electrode plate and the separator, at least one of which is charged, into direct contact such that the first electrode plate and the separator are attached to each other to form a laminated body; and a second laminating step of laminating the second electrode plate on the laminated body to form the electrode body, wherein the charging step includes charging at least the first electrode plate such that a discharge voltage between the first electrode plate and the separator to be brought into contact in the first laminating step falls within a range from 1 kV to 20 kV inclusive, and the first laminating step comprises passing a sheet, comprising the first electrode plate, and a sheet, comprising the separator, simultaneously through a pair of rollers such that the sheet comprising the separator comes into direct contact with and laminates the sheet comprising the first electrode plate.

2. The method of claim 1, wherein the charging step includes charging at least the first electrode plate such that the discharge voltage between the first electrode plate and the separator to be brought into contact in the first laminating step falls within a range from 1 kV to 17 kV inclusive.

3. The method of claim 1, wherein the charging step includes charging at least the first electrode plate such that the discharge voltage between the first electrode plate and the separator to be brought into contact in the first laminating step falls within a range from 1 kV to 15 kV inclusive.

* * * * *